US008934778B2

(12) United States Patent
Futami et al.

(10) Patent No.: US 8,934,778 B2
(45) Date of Patent: Jan. 13, 2015

(54) OUTPUT VALUE CONTROL METHOD AND TRANSMISSION APPARATUS

(71) Applicant: Hitachi, Ltd., Tokyo (JP)

(72) Inventors: Yusho Futami, Yokohama (JP); Kazuhiro Watanabe, Hayama-machi (JP)

(73) Assignee: Hitachi, Ltd., Tokyo (JP)

( * ) Notice: Subject to any disclaimer, the term of this patent is extended or adjusted under 35 U.S.C. 154(b) by 155 days.

(21) Appl. No.: 13/682,197

(22) Filed: Nov. 20, 2012

(65) Prior Publication Data

US 2013/0322878 A1    Dec. 5, 2013

(30) Foreign Application Priority Data

Nov. 24, 2011  (JP) ................................. 2011-256011

(51) Int. Cl.
*H04B 10/00* (2013.01)
*H04B 10/564* (2013.01)
*H04B 10/077* (2013.01)
*H04B 10/079* (2013.01)

(52) U.S. Cl.
CPC .......... *H04B 10/564* (2013.01); *H04B 10/0775* (2013.01); *H04B 10/07955* (2013.01)
USPC ............. 398/135; 398/136; 398/137; 398/38; 398/197

(58) Field of Classification Search
CPC ...................... H04B 10/0775; H04B 10/07955; H04B 10/564; H04W 52/228; H04W 52/367
USPC ........... 398/135, 136, 137, 138, 139, 38, 196, 398/197, 93, 94, 95, 120
See application file for complete search history.

(56) References Cited

U.S. PATENT DOCUMENTS

| | | | | |
|---|---|---|---|---|
| 5,450,616 | A | * | 9/1995 | Rom ................................ 455/69 |
| 6,369,693 | B1 | * | 4/2002 | Gibson .......................... 340/5.8 |
| 6,560,463 | B1 | * | 5/2003 | Santhoff ........................ 455/522 |
| 6,829,468 | B2 | * | 12/2004 | Gandhi et al. .................. 455/69 |
| 7,072,582 | B2 | * | 7/2006 | Stevens ........................... 398/38 |
| 8,086,100 | B2 | * | 12/2011 | Aronson et al. ................ 398/38 |
| 8,275,269 | B2 | * | 9/2012 | Onaka ........................... 398/177 |

(Continued)

FOREIGN PATENT DOCUMENTS

| | | | |
|---|---|---|---|
| EP | 0 921 644 A1 | 6/1999 | |
| EP | 0921644 A1 | * 6/1999 | ............. H04B 7/005 |

(Continued)

*Primary Examiner* — Daniel Washburn
*Assistant Examiner* — Hibret Woldekidan
(74) *Attorney, Agent, or Firm* — Volpe and Koenig, P.C.

(57) ABSTRACT

The object of the present invention is to reliably prevent deterioration and failure of reception relevant parts in a transmission apparatus on a reception side without using an attenuator. An output value control method that controls an output value of output information transmitted from each of transmission apparatuses, in which a transmission apparatus transmits the output information having a minimum output value as the output value to the other transmission apparatus, and when the output information does not reach the other transmission apparatus, the transmission apparatus repeats transmission of the output information after increasing the own output value by adding a predetermined value to a previous output value, and then the other transmission apparatus that has received the output information calculates the output value of the transmission apparatus, and notifies the calculated output value of the transmission apparatus as an appropriate output value to the transmission apparatus.

12 Claims, 15 Drawing Sheets

(56) References Cited

U.S. PATENT DOCUMENTS

| | | | |
|---|---|---|---|
| 8,515,284 B2* | 8/2013 | Aronson et al. | 398/135 |
| 2005/0111843 A1* | 5/2005 | Takeuchi et al. | 398/38 |
| 2010/0246598 A1* | 9/2010 | Bremer et al. | 370/464 |
| 2012/0237242 A1* | 9/2012 | Maeda | 399/67 |
| 2012/0263460 A1* | 10/2012 | Movassaghi et al. | 398/38 |
| 2014/0106679 A1* | 4/2014 | Kanauchi | 455/63.1 |

FOREIGN PATENT DOCUMENTS

| | | | | |
|---|---|---|---|---|
| EP | 1 017 187 A2 | 7/2000 | | |
| EP | 1017187 A2 * | 7/2000 | ............. | H04B 7/005 |
| JP | 2010-154375 A | 7/2010 | | |
| WO | 02/27964 A1 | 4/2002 | | |
| WO | WO02/27964 * | 4/2002 | ............... | H04Q 7/20 |

* cited by examiner

STATION "A" SIDE → STATION "B" SIDE

STATION "B" SIDE → STATION "A" SIDE

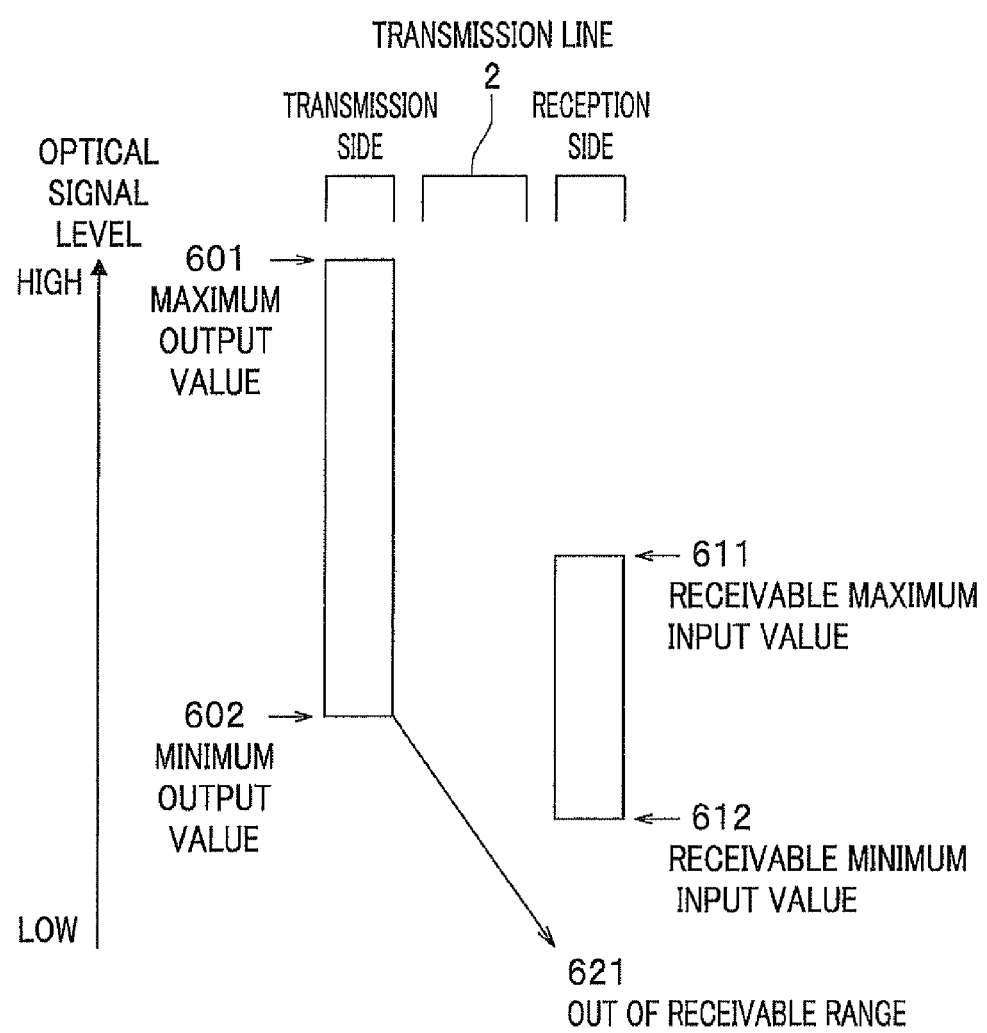

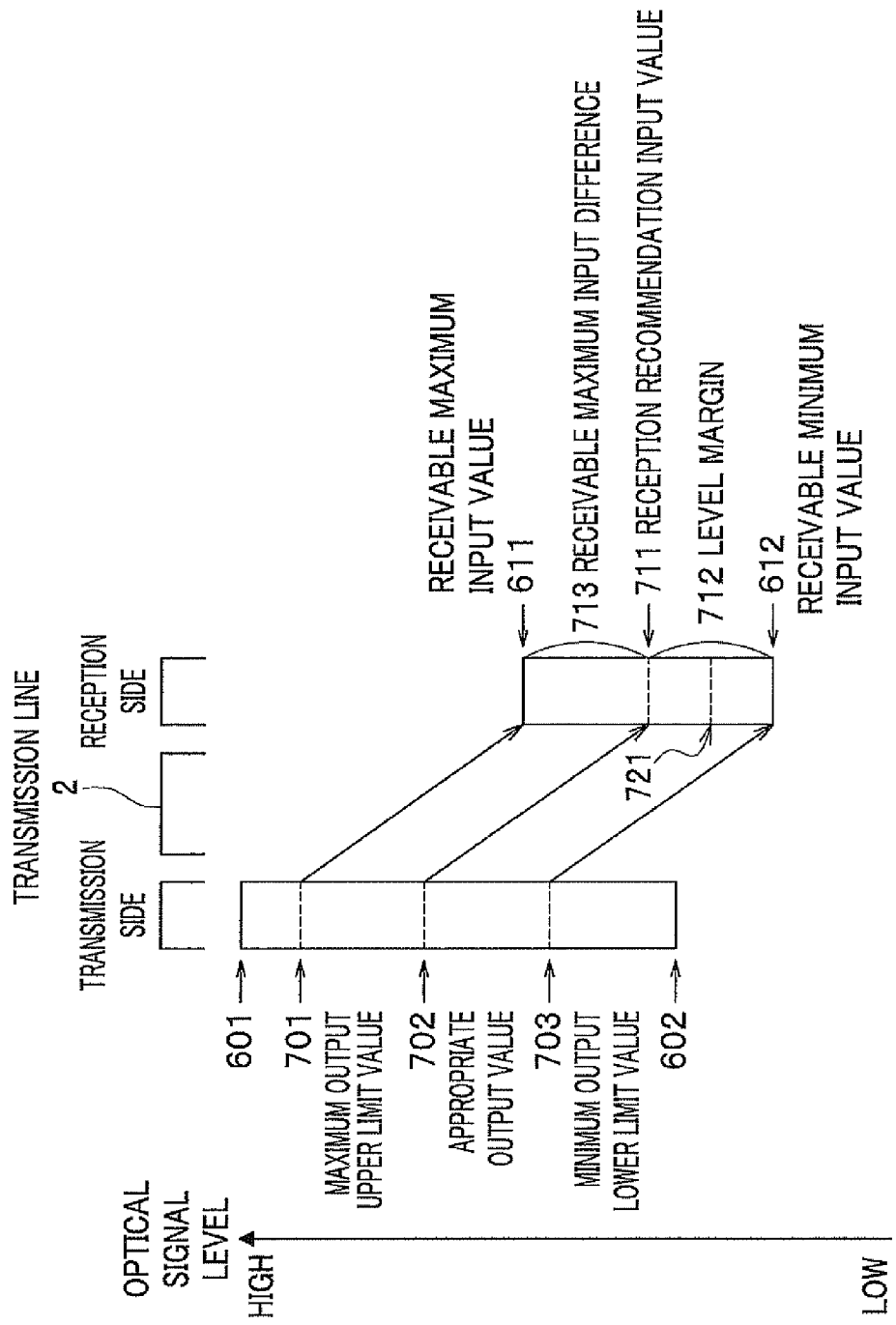

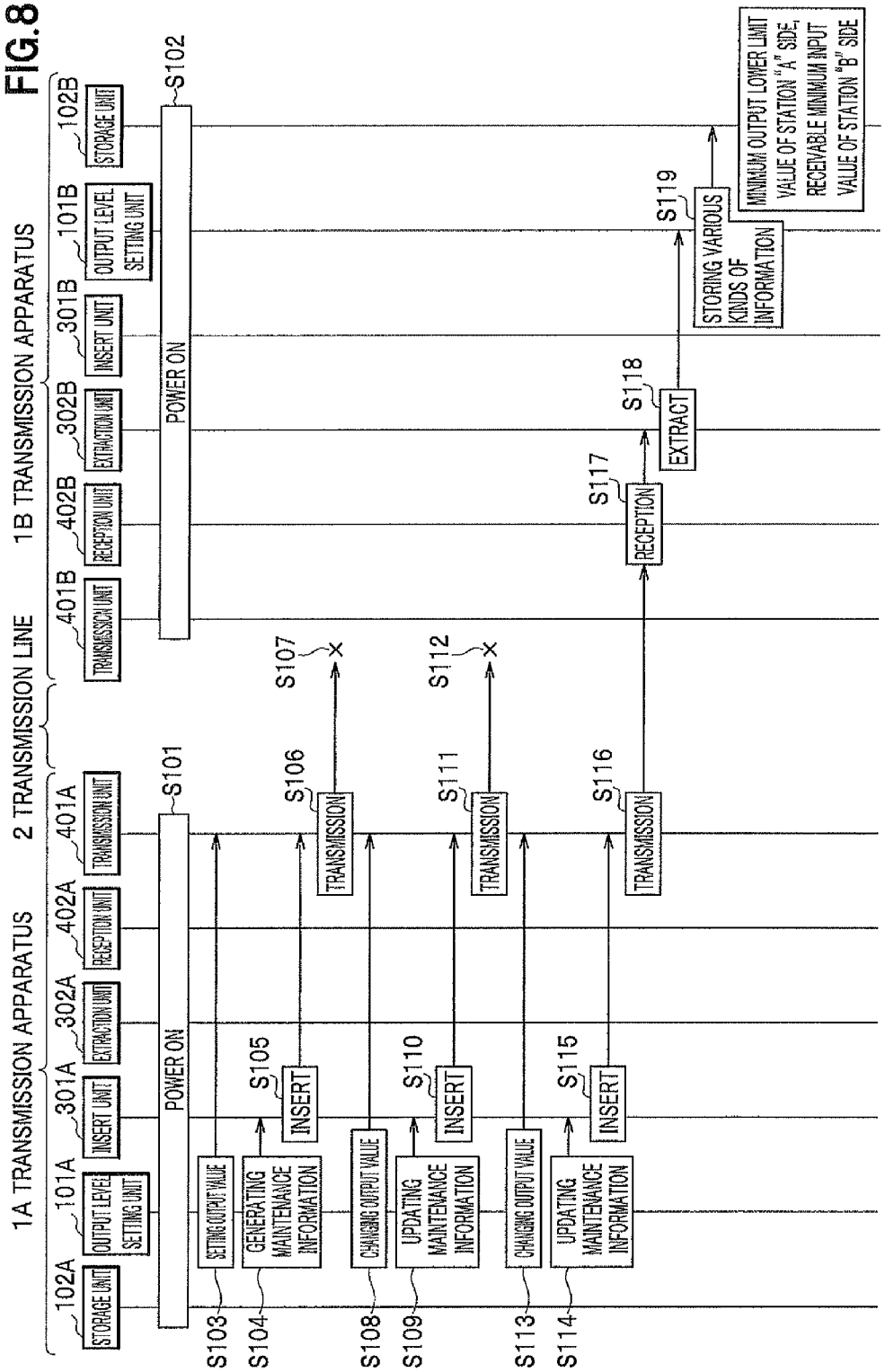

OUTPUT VALUE CONTROL METHOD AND TRANSMISSION APPARATUS

TECHNICAL FIELD

The present invention relates to an output value control method when transmitting and receiving information, and a technology of a transmission apparatus that transmits and receives information.

BACKGROUND ART

There have been widely used optical transmission systems which can transmit a large amount of data at a high speed through a transmission line such as an optical cable in recent years. FIG. 15 is a diagram showing an example of a typical configuration of a conventional optical transmission system. The optical transmission system Zb is divided into a station "A" side and a station "B" side. On the station "A" side are installed a terminal 4A (4) and a transmission apparatus 1Ab (1b), and on the station "B" side are installed a terminal 4B (4) and a transmission apparatus 1Bb (1b). The transmission apparatus 1Ab on the station "A" side and the transmission apparatus 1Bb on the station "B" side are connected with each other through a transmission line 2. The transmission line 2 is a section for an optical communication through an optical cable and the like whose length is from several kilometers to one hundred and several tens kilometers. In addition, each station has a configuration of the terminal 4 and the transmission apparatus 1b to be connected with each other.

The terminals 4 installed on the station "A" side and the station "B" side, generate data to transmit the data to the transmission line 2 through the transmission apparatus 1b, and receive data from the transmission line 2 through the transmission apparatus 1b to process the data. The transmission apparatuses 1b installed on the station "A" side and the station "B" side, receive the data from terminals 4 installed on themselves (i.e., of the own station) to transmit the data to an opposite station through the transmission line 2, and receive the data from the transmission line 2 to transmit the data to the terminal 4 of the own station.

The transmission apparatus 1b includes a transponder unit 10b and a monitoring control unit 20b. The transponder unit 10b receives the data from the terminal 4 to convert the data to optical signals and transmits the optical signals to the transmission line 2, while the transponder unit 10b receives the data from the transmission line 2 to convert the data to digital signals from the optical signals and transmits the digital signals to the terminal 4 of the own station. The transponder unit 10b includes a terminal connection unit 200b, a data processing unit 300b, and an optical-electrical conversion unit 400b. The terminal connection unit 200b is adapted to be in connection with the terminal 4 to transmit and receive the data with the terminal 4. The data processing unit 300b is adapted to receive the data from the terminal connection unit 200b to transmit the data to the optical-electrical conversion unit 400b, and to receive the data from the optical-electrical conversion unit 400b to transmit the data to the terminal connection unit 200b. The optical-electrical conversion unit 400b is connected with the transmission line 2, and is adapted to convert the data transmitted from the terminal 4 to the optical signals and to convert the optical signals received from the transmission line 2 to the digital signals. The monitoring control unit 20b is adapted to monitor the data to be transmitted and received through the transmission line 2.

Here, in one of the transmission apparatuses 1b, an attenuator 5 is installed at the connection portion with the transmission line 2. The attenuator 5 is a so-called attenuator, and is adapted to control levels of the optical signals to be transmitted and received. The optical-electrical conversion unit 400b always outputs the optical signals at a constant level so that the communication can be performed up to a maximum distance requested on the basis of standards of the optical transmission system Zb and specifications of the transmission apparatus 1b. However, the optical-electrical conversion unit 400b may cause deterioration or failure upon receiving an optical signal which has too high optical signal level. When a distance of the transmission line 2 is short enough, the optical signal level is adjusted by the attenuator 5 to be within a receivable optical signal level of the optical-electrical conversion unit 400b on the opposite station side. This means that the transmission apparatuses 1b transmit the optical signals at a level high enough to reach a long distance and attenuate the optical signals by the attenuator 5 when the distance between the transmission apparatuses 1b is short. As shown in FIG. 15, the attenuator 5 can be installed on either end side of the transmission line 2.

In this case, since the transmission apparatuses 1b transmit the optical signals at a level having a considerable margin for the distance of the transmission line 2, unnecessary power can be consumed. In other words, in the optical transmission system Zb, unnecessary power is consumed because the transmission apparatuses 1b attenuate the optical signals by the attenuator 5 after having transmitted the optical signals at a high level.

To solve the above problem, a transmission apparatus and its optical output level control method are disclosed in Patent Document 1. The transmission apparatus on a transmission side transmits a signal at a predetermined optical output level to the transmission apparatus on a reception side, and then an optical output level on the transmission side is determined on the basis of an optical reception level received by the transmission apparatus on the reception side to notify the determined optical output level to the transmission apparatus on the transmission side. This means that, in a technology described in Patent Document 1, the transmission apparatus (parent apparatus) transmits an optical signal once at the beginning. The transmission apparatus (child apparatus) on the opposite side calculates an optical input level margin on the basis of an optical reception level of a received optical signal, and transmits the calculated level margin to the transmission apparatus which is the parent apparatus. The transmission apparatus having received the optical input level margin adjusts the optical output level according to the optical input level margin. In this way, in the technology described in Patent Document 1, the transmission apparatus realizes an energy saving control which refrains from consuming unnecessary power without using an attenuator by reducing the optical output level of the optical-electrical conversion unit in accordance with the distance of the transmission line.

CITATION LIST

Patent Literature

{Patent Document 1}
Japanese Patent Application Publication No. 2010-154375

SUMMARY OF INVENTION

Technical Problem

The distances of the transmission lines are often short in practical uses, and an attenuator is connected to the transmission line in most cases. In this case, the optical output level is attenuated by the attenuator and is adjusted to be within a receivable optical signal level of the optical-electrical conversion unit 400*b* (see FIG. 15) on the reception side. Since the optical-electrical conversion unit 400*b* transmits signals at the optical output level having the considerable margin for the distance of the transmission line, unnecessary power is to be consumed as described above.

In the technology described in Patent Document 1, the parent apparatus transmits a first optical signal without knowing a receivable optical reception level of the child apparatus side. Therefore, there is a case that an optical signal larger than or equal to the receivable optical reception value is received on the child apparatus when the transmitted optical signal level is higher than the receivable optical reception level on the child apparatus side, and that may lead to deterioration or failure of the reception relevant parts on the child apparatus side.

The present invention is devised in view of such a background, and a purpose of the present invention is to reliably prevent deterioration or failure of the reception relevant parts of the transmission apparatus on the reception side without using an attenuator.

Solution to Problem

To solve the above problems, the output value control method according to the present invention is carried out between transmission apparatuses that transmit and receive information, which controls an output value of output information transmitted from each transmission apparatus, in which a first transmission apparatus transmits the output information having a minimum output value as the output value to a second transmission apparatus which is different from the first transmission apparatus as well as notifies the minimum output value as the own output value to the second transmission apparatus, the first transmission apparatus repeating a transmission of the output information and a notification of the own output value at the time of the transmission after increasing the own output value by adding a predetermined value to a previous output value when the output information does not reach the second transmission apparatus, the second transmission apparatus that receives the output information calculating the output value of the first transmission apparatus on the basis of the notified output value, and notifying the calculated output value of the first transmission apparatus as an appropriate output value to the first transmission apparatus, and the first transmission apparatus transmitting and receiving information to and from the second transmission apparatus with the notified appropriate output value. Other means for solving the above problems will be described as appropriate in the following embodiments.

Advantageous Effects of Invention

The present invention can reliably prevent deterioration or failure of the reception relevant parts in the transmission apparatus on the reception side without using an attenuator.

BRIEF DESCRIPTION OF DRAWINGS

FIG. 6 is a diagram showing a relationship of optical signal levels between the transmission side and the reception side according to the first embodiment of the present invention.

FIG. 7 is a diagram showing a relationship between output levels and reception levels taking into account the loss of the transmission line between the transmission side and the reception side according to the first embodiment of the present invention.

FIG. 8 is a sequence diagram showing a procedure of output value determination processes according to the first embodiment of the present invention (Part 1).

DESCRIPTION OF EMBODIMENTS

Next, embodiments for carrying out the present invention (referred to as an "embodiment") will be explained in details with reference to the accompanying drawings.

First Embodiment

Figure 1:
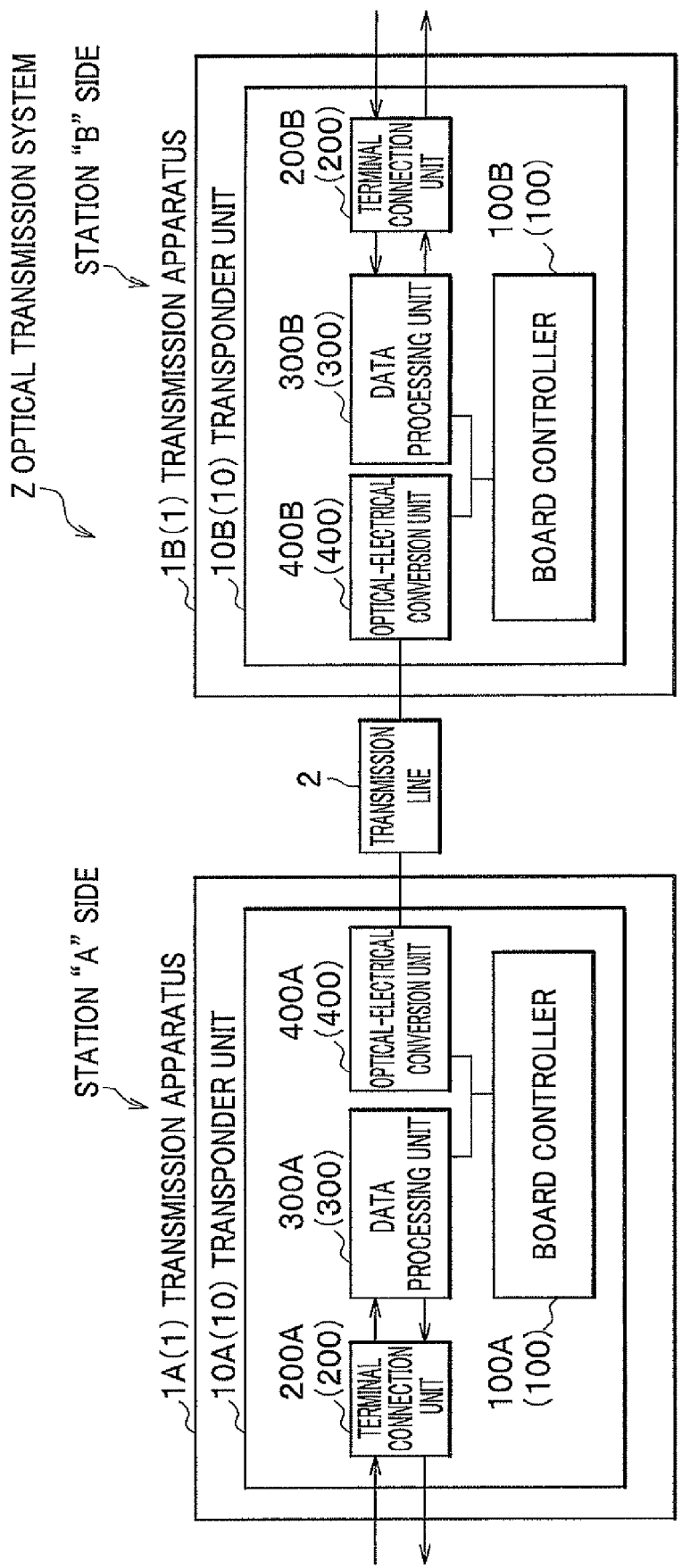
FIG. 1 is a block diagram showing a configuration example of an optical transmission system according to a first embodiment of the present invention.

The first embodiment according to the present invention will be explained with reference to FIGS. 1 to 13.
(System Configuration)
FIG. 1 is a block diagram showing a configuration example of an optical transmission system according to the first embodiment of the present invention. The optical transmission system Z is divided into a station "A" side and a station "B" side, and has a transmission apparatus 1 (1A, 1B) on each station to be connected with each other through a transmission line 2.

In other words, the transmission apparatus 1A which is a first transmission apparatus 1 is installed on the station "A" side, and the transmission apparatus 1B which is a second transmission apparatus 1 is installed on the station "B" side. Hereinafter, a suffix "A" is attached to the end of a reference sign for elements constituting the station "A" side, and a suffix "B" is attached to the end of the reference sign for elements constituting the station "B" side. The transmission line 2 is an optical cable, for example. The transmission apparatus 1 includes transponder units 10 (10A, 10B). The transponder unit 10 converts digital data received from a terminal (not shown) to optical signals to transmit the optical signals to the transmission line 2, and converts optical signals received from through the transmission line 2 to digital data to transmit the digital data to the terminal while the transponder unit 10 generates and stores maintenance information (described in details later) in which information about an output value is stored.

The transponder unit 10 includes board controllers 100 (100A, 100B), terminal connection units 200 (200A, 200B), data processing units 300 (300A, 300B), and optical-electrical conversion units 400 (400A, 400B). The terminal connection unit 200 is connected with the terminal which transmits and receives the data, and receives the data from the terminal and transmits the data to the terminal. In other words, the transmission apparatus 1 in each station is connected with the terminal (not shown) at the terminal control unit 200. The data processing unit 300 mediates the transmission and reception of the data between the terminal connection unit 200 and the optical-electrical conversion unit 400 as well as generates output information by inserting into the data the maintenance information in which information necessary for the data transmission is stored. The optical-electrical conversion unit 400 converts the output information to the optical signals and transmits the optical signals to the transmission line 2 as well as converts the optical signals transmitted from the transmission line 2 to the digital data and transmits the digital data to the terminal side. The board controller 100 performs setting of an output level and storing to hold the maintenance information. In the present embodiment, the term "level" such as "output level" is used for a degree of the optical signal, and the term "value" such as "output value" is used for a specific value.

Figure 2:
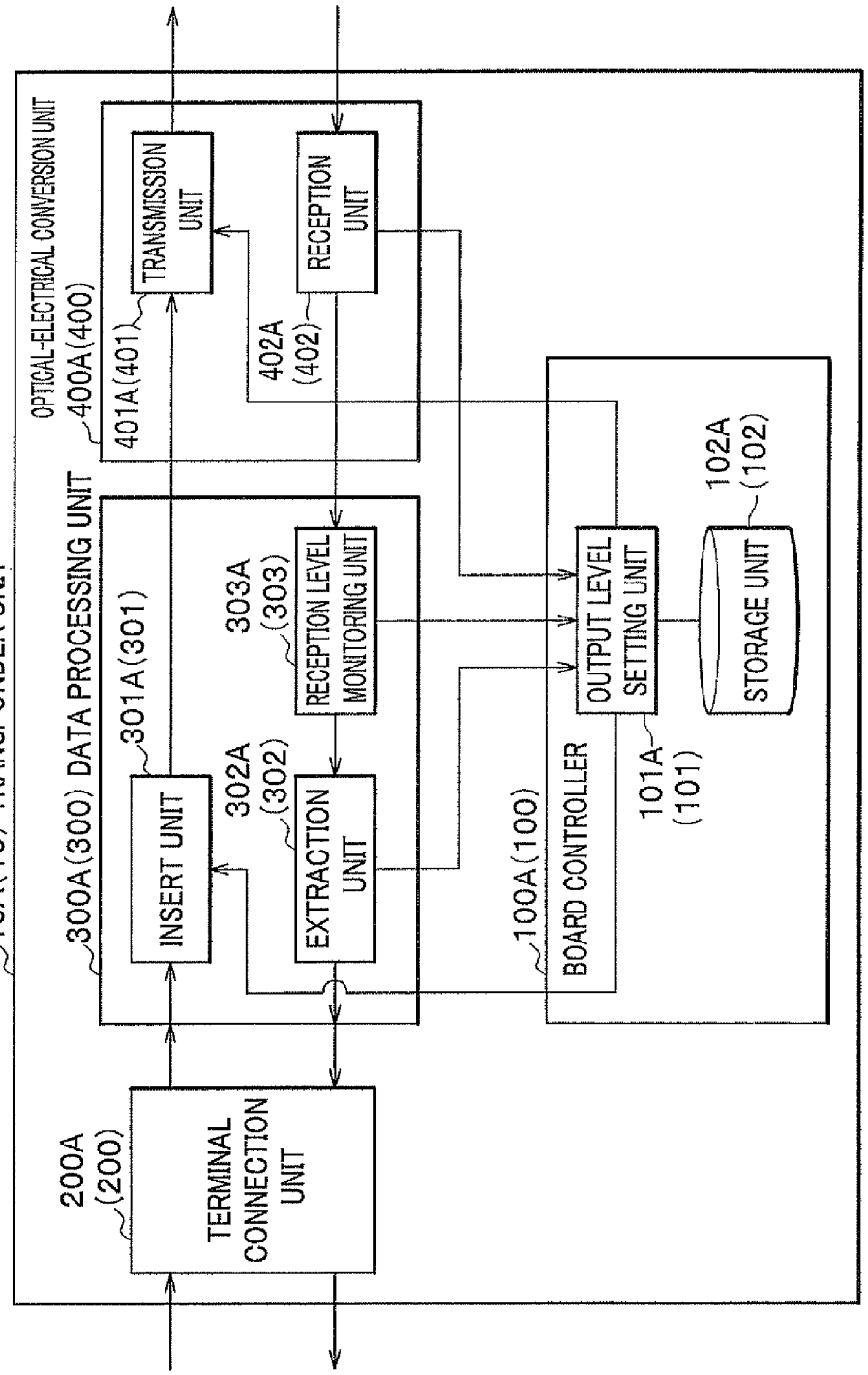
FIG. 2 is a diagram showing a configuration example of a transponder unit on a station "A" side.

FIG. 2 is a diagram showing a configuration example of the transponder unit on the station "A" side. In FIG. 2, the same constituent elements as those of FIG. 1 are denoted by the same reference signs and the explanations thereof will be omitted. In the transponder unit 10A (10), the data processing unit 300A (300) includes an insert unit 301A (301), an extraction unit 302A (302), and a reception level monitoring unit 303A (303). The insert unit 301A (301) inserts into the output information the maintenance information which is generated in the board controller 100A (100). The extraction unit 302A (302) extracts the maintenance information in the output information transmitted from the other stations and transmits the maintenance information to the board controller 100A (100). The reception level monitoring unit 303A (303) monitors a reception level and an error rate of the output information which is transmitted from the opposite station through the transmission line 2.

The optical-electrical conversion unit 400A (400) includes a transmission unit 401A (401) which is capable of changing the output value and converts the output information to the optical signals to transmit the optical signals to the transmission line 2, and a reception unit 402A (402) which converts the received output information from the optical signals to the digital data to transmit the digital data to the reception level monitoring unit 303A (303). In addition, the reception unit 402 may measure the reception level.

The board controller 100A (100) includes an output level setting unit 101A (101) and a storage unit 102A (102). The output level setting unit 101A (101) sets an output value in the transmission unit 401A (401) as well as performs processes such as to generate the maintenance information in which information about the output value is described. The storage unit 102A (102) stores the information about the output level in the maintenance information, and the like.

Figure 3:
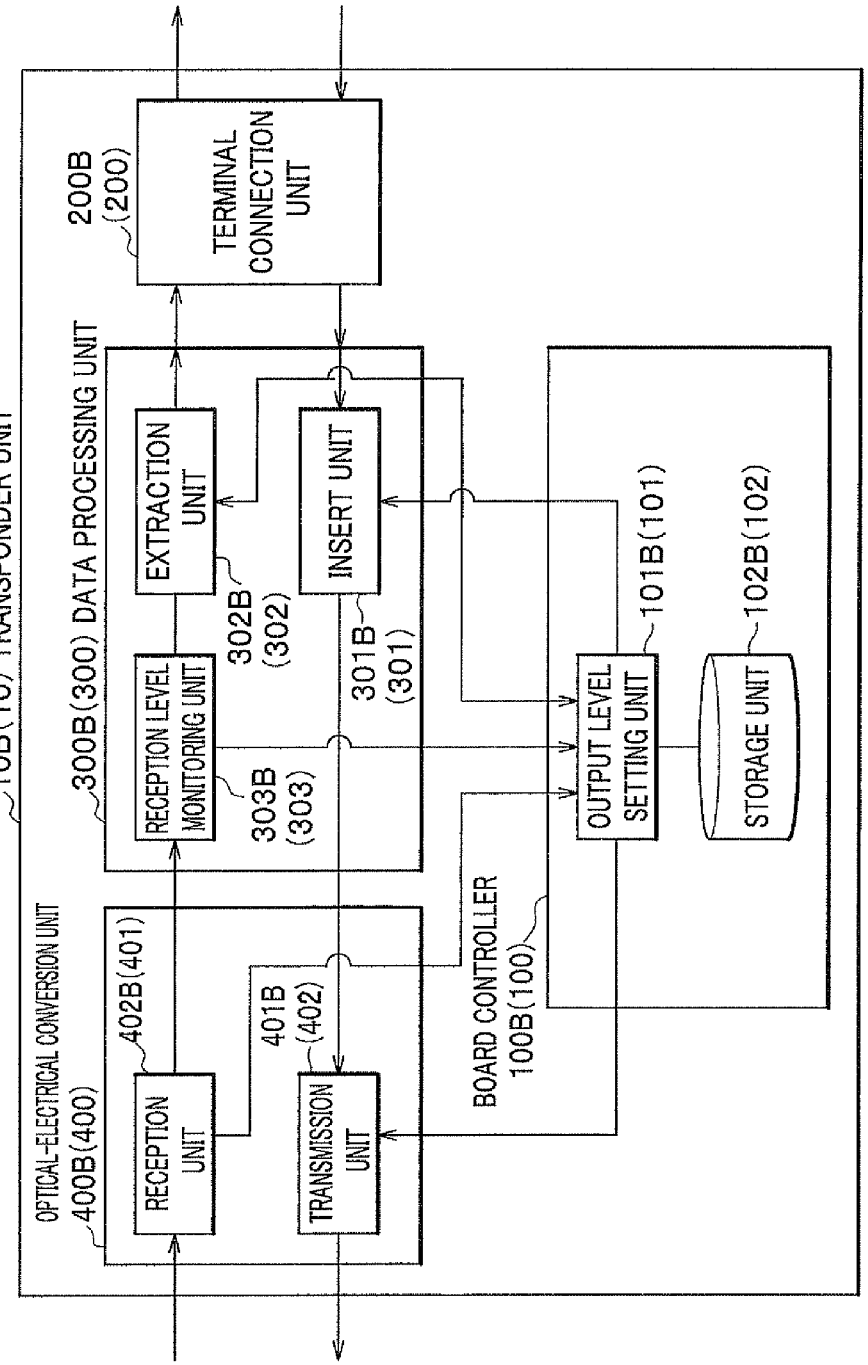
FIG. 3 is a diagram showing an example configuration of a transponder unit on a station "B" side.

FIG. 3 is a diagram showing an example configuration of the transponder unit on the station "B" side. Since FIG. 3 has the same configuration with FIG. 2, a suffix "B" which denotes the station "B" side is attached to the end of the reference sign, and the description thereof is omitted.

The output level setting unit 101, the data processing unit 300, the insert unit 301, the extraction unit 302, and the reception level monitoring unit 303 are realized by CPU (Central Processing Unit) executing programs stored in ROM (Read Only Memory).

Figure 4:
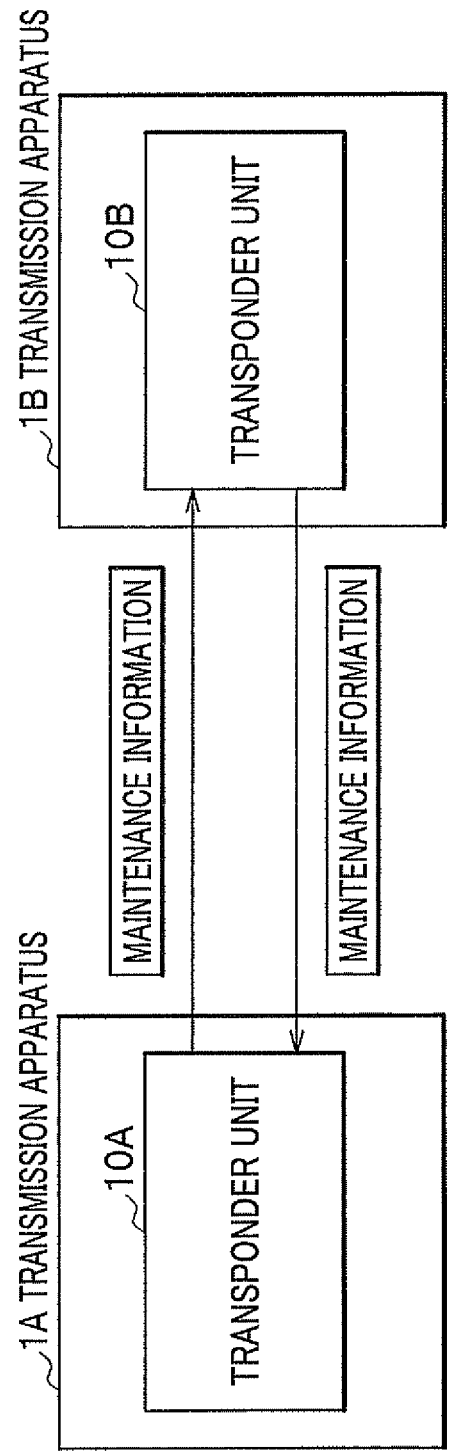
FIG. 4 is a diagram showing a transmission and reception of maintenance information according to the first embodiment of the present invention.

FIG. 4 is a diagram showing the transmission and reception of the maintenance information according to the first embodiment of the present invention. As shown in FIG. 4, the maintenance information is transmitted and received between the transponder unit 10A of the transmission apparatus 1A on the station "A" side and the transponder unit 10B of the transmission apparatus 1B on the station "B" side, and each transmission apparatus 1 performs setting of the output value on the basis of the maintenance information.

(Maintenance Information)

Figure 5A:
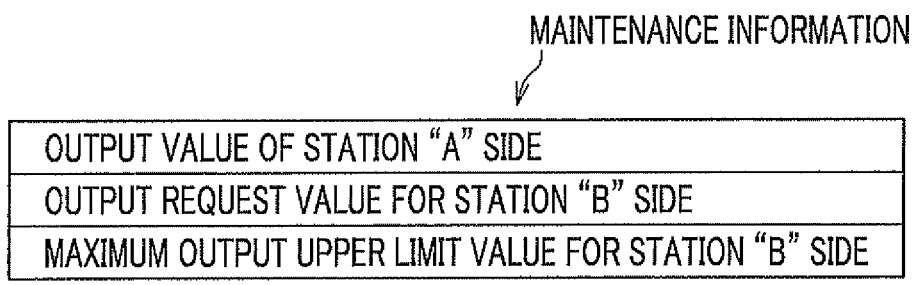
FIGS. 5A and 5B are diagrams showing a specific format of maintenance information according to the first embodiment of the present invention.
Figure 5B:
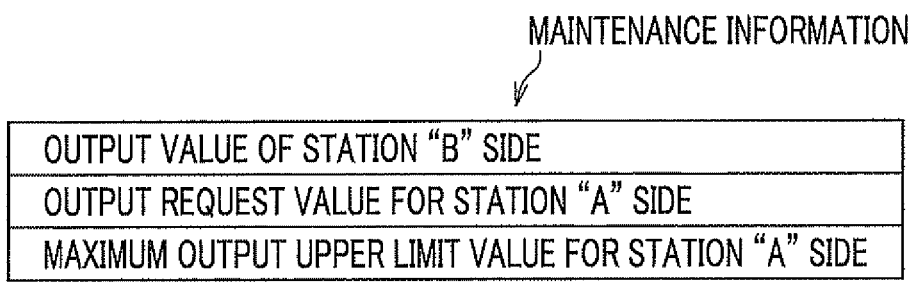

FIGS. 5A and 5B are diagrams showing a specific format of the maintenance information according to the first embodiment of the present invention. FIG. 5A is the maintenance information transmitted to the transmission apparatus 1B on the station "B" side from the transmission apparatus 1A on the station "A" side. The maintenance information transmitted to the transmission apparatus 1B on the station "B" side from the transmission apparatus 1A on the station "A" side includes fields of "output value of station "A" side", "output request value for station "B" side", and "maximum output upper limit value for station "B" side". The "output value of station "A" side" is stored with the current output value in the transmission apparatus 1A on the station "A" side. The "output request value for station "B" side" is the output value of the transmission apparatus 1B on the station "B" side, requested by the transmission apparatus 1A on the station "A" side. The "maximum output upper limit value for station "B" side" is the maximum output value of the transmission apparatus 1B on the station "B" side, requested by the transmission apparatus 1A on the station "A" side.

FIG. 5B is the maintenance information transmitted to the transmission apparatus 1A on the station "A" side from the transmission apparatus 1B on the station "B" side. The maintenance information transmitted to the transmission apparatus 1A on the station "A" side from the transmission apparatus 1B on the station "B" side includes fields of "output value of station "B" side", "output request value for station "A" side", and "maximum output upper limit value for station "A" side". The "output value of station "B" side" is stored with the current output value in the transmission apparatus 1B on the station "B" side. The "output request value for station "A" side" is the output value of the transmission apparatus 1A on the station "A" side, requested by the transmission apparatus 1B on the station "B" side. The "maximum output upper limit value for station "A" side" is the maximum output value of the transmission apparatus 1A on the station "A" side, requested by the transmission apparatus 1B on the station "B" side.

(Optical Signal Level)

FIG. 6 is a diagram showing a relationship of optical signal levels between the transmission side and the reception side according to the first embodiment of the present invention. In FIGS. 6 and 7, the optical signal level becomes high as going upward in the drawing, and becomes low as going downward in the drawing. The maximum output value 601 on the transmission side is the maximum value of the optical signal which can be outputted by the transmission unit 401 of the transmission apparatus 1 on the transmission side. In other words, the transmission unit 401 of the transmission apparatus 1 on the transmission side cannot output by hardware the optical signal larger than the maximum output value 601. The minimum output value 602 on the transmission side is the minimum value of the optical signal which can be outputted by the transmission unit 401 of the transmission apparatus 1 on the transmission side. In other words, the transmission unit 401 of the transmission apparatus 1 on the transmission side cannot output by hardware the optical signal smaller than the minimum output value 602.

The receivable maximum input value 611 on the reception side is the maximum value of the optical signal which can be received by the reception unit 402 of the transmission apparatus 1 on the reception side. In other words, if the reception unit 402 of the transmission apparatus 1 on the reception side receives the optical signal which has the optical signal level higher than the receivable maximum input value 611, there is a possibility that the optical signal causes deterioration and failure of the reception unit 402. The receivable minimum input value 612 on the reception side is the minimum value of the optical signal which can be received by the reception unit 402 of the transmission apparatus 1 on the reception side. In other words, the reception unit 402 of the transmission apparatus 1 on the reception side cannot receive by hardware the optical signal which has the optical signal level lower than the receivable minimum input value 612 (out of receivable range).

The reference sign 621 indicates that the optical signal transmitted with the minimum output value 602 on the transmission side becomes smaller than the receivable minimum input value 612 when the optical signal reaches the transmission apparatus 1 on the reception side because the optical signal level is attenuated through the transmission line 2, and cannot be received on the reception side (out of receivable range).

FIG. 7 is a diagram showing a relationship between output levels and reception levels taking into account the loss of the transmission line between the transmission side and the reception side according to the first embodiment of the present invention. In FIG. 7, the same elements as those of FIG. 6 are denoted by the same reference signs and the explanations thereof will be omitted. The maximum output upper limit value 701 is the output level obtained by adding the loss of the transmission line 2 to the receivable maximum input value 611. This means that if the transmission apparatus 1 on the transmission side outputs the optical signal with the output value larger than the maximum output upper limit value 701, the optical signal received by the transmission apparatus 1 on the reception side has the reception level exceeding the receivable maximum input value 611.

The minimum output lower limit value 703 is the output level obtained by adding the loss of the transmission line 2 to the receivable minimum input value 612. This means that if the transmission apparatus 1 on the transmission side outputs the optical signal with the output value smaller than the minimum output lower limit value 703, the optical signal received by the transmission apparatus 1 on the reception side has the reception level below the receivable minimum input value 612. In other words, the transmission apparatus 1 must output the optical signal with the output value smaller than or equal to the maximum output upper limit value 701 and larger than or equal to the minimum output lower limit value 703 to protect the reception unit 402 on the reception side. A receivable maximum input difference 713 is a difference value between the receivable maximum input value 611 and a reception recommendation input value 711.

The reception recommendation input value 711 is a recommended reception level for the transmission apparatus 1 on the reception side. The reception recommendation input value 711 is a value obtained by adding a predetermined level value 711 to the receivable minimum input value 612. An appropriate output value 702 is an output level obtained by adding the loss of the transmission line 2 to the reception recommendation input value 711, and is a value which is eventually outputted by the transmission apparatus 1 on the transmission side. The level margin 712 is a value determined in advance by a user taking into account a data error rate being lower than a specified value, a loss variation of the transmission line 2, aging deterioration of components of the transmission unit 401 and the reception unit 402, and the like.

A monitoring threshold value 721 is a threshold value for detecting an increase of the loss of the transmission line 2 by the reception level monitoring unit 303, when the loss of the transmission line 2 increases and the reception level becomes smaller than or equal to the monitoring threshold value 721.

(Procedure)

Figure 9:
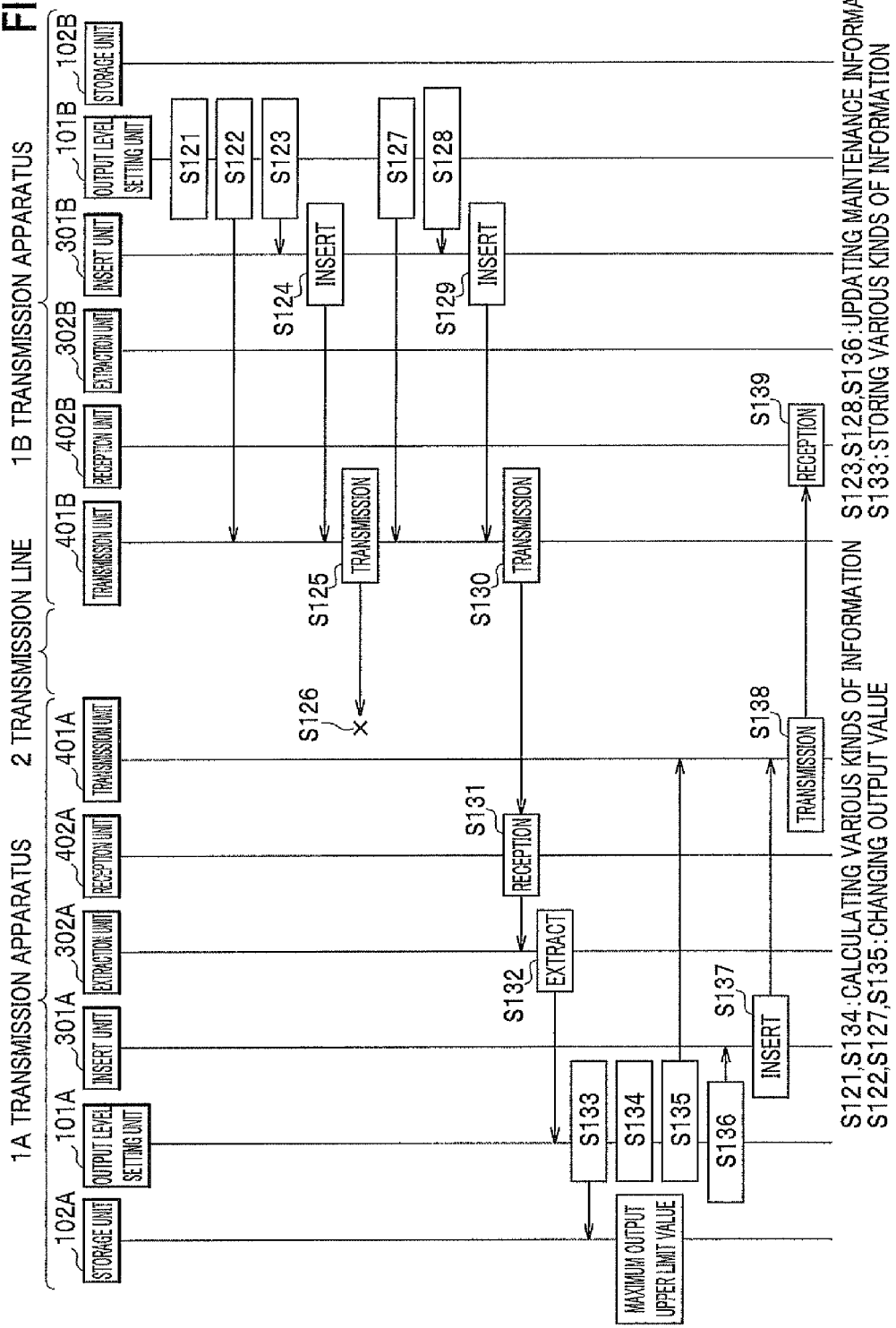
FIG. 9 is a sequence diagram showing a procedure of output value determination processes according to the first embodiment of the present invention (Part 2).

FIGS. 8 and 9 are sequence diagrams showing a procedure of output value determination processes according to the first embodiment of the present invention. First, the transmission apparatus 1A on the station "A" side and the transmission apparatus 1B on the station "B" side are turned on (S101, S102 in FIG. 8), and the output level setting unit 101A on the station "A" side sets the "minimum output value" (602 in FIG. 6) to the output value of the own transmission unit 401A (S103) and generates maintenance information stored with the output value (S104). The output value of the transmission unit 401A is the "minimum output value (suppose Xmin)" (602 in FIG. 7) at this time, and the value is written in the field of "output value of station "A" side" of the maintenance information. Other fields of the maintenance information remain vacant. Then, the generated maintenance information is inserted into the output information in the insert unit 301A (S105), and the output information is transmitted by the transmission unit 401A to the transmission line 2 (S106). The output information having the intensity of the minimum output value (602 in FIG. 7) of the station "A" is transmitted at this time. This means that the transmission apparatus 1A notifies the own output value to the transmission apparatus 1B by the maintenance information. However, the output value is so small (i.e., out of receivable range: 621 in FIG. 6) that the output information does not reach the transmission apparatus 1B on the station "B" side (S107).

The output level setting unit 101A changes the output value of the transmission unit 401A to a value increased by a predetermined value (S108) and updates the maintenance information (S109) after confirming that a response does not come from the transmission apparatus 1B on the station "B" side for a predetermined time. The output value of the transmission unit 401A is "Xmin+x" at this time, and the value is written in the field of "output value of station "A" side" of the maintenance information. The other fields of the maintenance information remain vacant. Here, "x" is a predetermined value. Then, the generated maintenance information is inserted into the output information in the insert unit 301A (S110), and the output information inserted with the maintenance information is outputted from the transmission unit 401A (S111). The output information having the intensity of "Xmin x" is transmitted at this time. However, the output value is so small that the output information does not reach the transmission apparatus 1B on the station "B" side (S112).

The output level setting unit 101A changes the output value of the transmission unit 401A to a value increased by a predetermined value (S113) and updates the maintenance information (S114) after confirming that a response has not come from the transmission apparatus 1B on the station "B" side for a predetermined time. The output value of the transmission unit 401A is "Xmin+2x" at this time, and the value is written in the field of "output value of station "A" side" of the maintenance information. The other fields of the maintenance information remain vacant. Then, the generated maintenance information is inserted into the output information in the insert unit 301A (S115), and the output information inserted with the maintenance information is outputted from the transmission unit 401A (S116). The output information having the intensity of "Xmin+2x" is transmitted at this time.

The output information reaches the transmission apparatus 1B on the station "B" side, and the reception unit 402B of the station "B" receives the output signal (S117). More specifically, the reception level monitoring unit 303B (see FIG. 3) detects that the error rate of the output information is lower than or equal to a predetermined value. The reception level monitoring unit 303B measures the reception value of the output information at this time. The reception value is the receivable minimum input value (612 in FIGS. 6 and 7) on the station "B" side. In addition, the output value of the transmission apparatus 1A on the station "A" side is the minimum output lower limit value (703 in FIG. 7) at this time.

The extraction unit 302B extracts the maintenance information from the received output information (S118), and the output level setting unit 101B stores in the storage unit 102B various kinds of information written in the extracted maintenance information (S119). The output level setting unit 101B extracts "Xmin+2x" written in the field of "output value of station "A" side" of the received maintenance information, and stores the value as the "minimum output lower limit value of station "A" side" (703 in FIG. 7) in the storage unit 102B at this time. The output level setting unit 101B stores the reception value as "receivable minimum input value of station "B" side" (612 in FIG. 7) in the storage unit 102B at the same time.

Next, the output level setting unit 101B calculates the following various kinds of information (S121 in FIG. 9). First, the output level setting unit 101B calculates the "output request value for station "A" side" by adding a predetermined level margin (712 in FIG. 7) to the "minimum output lower limit value of station "A" side" (="output value of station "A" side") (703 in FIG. 7) stored in the storage unit 102B. The calculated "output request value for station "A" side" becomes the appropriate output value (702 in FIG. 7) of the transmission apparatus 1A on the station "A" side.

In addition, the output level setting unit 101B calculates the reception recommendation input value (711 in FIG. 7) of the station "B" side by adding a predetermined level margin (712 in FIG. 7) to the "receivable minimum input value of station "B" side" (612 in FIG. 7). The output level setting unit 101B calculates a receivable maximum input difference (713 in FIG. 7) which is a difference between the receivable maximum input value (611 in FIG. 7) and the reception recommendation input value (711 in FIG. 7), as the output level setting unit 101B knows the own receivable maximum input value (611 in FIG. 7). Here, the calculated receivable maximum input difference is stored in the storage unit 102B. Then, the output level setting unit 101B calculates the "maximum output upper limit value of station "A" side" (701 in FIG. 7) by adding the calculated receivable maximum input difference (713 in FIG. 7) to the "output request value for station "A" side" (=the appropriate output value on the station "A" side).

The same processes (not shown in FIGS. 8 and 9) as steps S103 to S116 have thus far been performed by the transmission apparatus 1B in parallel with the processes performed by the transmission apparatus 1A (described later in FIG. 10). Next, the output level setting unit 101B changes the output value of the transmission unit 401B (S122) by adding a predetermined value to the output value at the time of the previous output information transmission (not shown in FIGS. 8 and 9). The output value at this time is defined as "Y". Then, the output level setting unit 101B updates the maintenance information (S123). The output level setting unit 101B writes the current output value ("Y") of the station "B" side, the "output request value for station "A" side" calculated in the step S121, and the "maximum output upper limit value for station "A" side" calculated in the step S121 into the appropriate fields of the maintenance information at this time.

Then, the insert unit 301B inserts the updated maintenance information into the output information (S124), and the output information is outputted from the transmission unit 401B (S125). The output information having the output value "Y" is transmitted at this time. However, the output value is so small that the output information does not reach the transmission apparatus 1A on the station "A" side (S126).

The output level setting unit 101B changes the output value of the transmission unit 401B to the value increased by a predetermined value (S127) and updates the maintenance information (S128) after confirming that a response has not come from the transmission apparatus 1A on the station "A" side for a predetermined time. The output value of the transmission unit 401B is "Y+y" at this time, and the value is written in the field of "output value of station "B" side" of the maintenance information. Here, "y" is a predetermined value. In the fields of "output request value for station "A" side" and "maximum output upper limit value for station "A" side" of the maintenance information, the values calculated in the step S121 are written. Then, the insert unit 301B inserts the generated maintenance information into the output information (S129), and the output information is outputted from the transmission unit 401B (S130). The output information having the intensity of "Y+y" is transmitted at this time.

The output information reaches the transmission apparatus 1A, and the reception unit 402A receives the output signal (S131). The reception level monitoring unit 303A (see FIG. 2) measures the reception value at this time. The extraction unit 302A extracts the maintenance information from the received output information (S132), and the output level setting unit 101A stores in the storage unit 102A various kinds of information written in the maintenance information (S133). Here, the stored information are the "output request value for station "A" side", the "maximum output upper limit value for station "A" side", and the like in the received maintenance information. At this time, the output level setting unit 101A calculates various kinds of information such as the "output request value for station "B" side" and the "maximum output upper limit value for station "B" side" by the same procedures as the output level setting unit 101B on the station "B" side (S134). The output level setting unit 101A changes the output value of the transmission unit 401A to the value of "output request value for station "A" side" (i.e., the appropriate output value (702 in FIG. 7) on the station "A" side) in the received maintenance information (S135).

Next, the output level setting unit 101A updates the maintenance information (S136). The output level setting unit 101A stores the updated output value in the field of "output value of station "A" side" as well as writes the "output request value for station "B" side" and the "maximum output upper limit value for station "B" side" calculated in the step S134 into the appropriate fields of the maintenance information at this time. Here, all fields of the maintenance information transmitted and received between the transmission apparatus 1A and the transmission apparatus 1B have been filled. The insert unit 301A inserts the updated maintenance information into the output information (S137), and the transmission unit 401A transmits the output information to the transmission line 2 (S138), and then the reception unit 402B receives the output information (S139). The output information having the intensity of the appropriate output value (702 in FIG. 7) on the station "A" side is transmitted at this time. The transmission apparatus 1B changes the output value of the transmission unit 401B to the value written in the field of "output request value for station "B" side" of the received maintenance information. Hereafter, the transmission apparatus 1A and the transmission apparatus 1B transmit and receive information with the appropriate output value.

When the output information does not reach the destination transmission apparatus 1 even if the transmission apparatus repeats the transmission of the output information by increasing the output value, the originating board controller 100 displays information indicating that the output information does not reach the destination transmission apparatus 1 on a display of an administrator terminal (not shown). In this case, the administrator takes actions such as changing the optical-electrical conversion unit 400 to a unit satisfying the distance of the transmission line 2, because the optical characteristics of the optical-electrical conversion unit 400 mounted on the destination transmission apparatus 1 may not satisfy the distance of the transmission line 2.

The transmission apparatus 1 can set the appropriate output value for the transmission line 2 by performing such processes. Since the transmission apparatus 1 can set the appropriate output value for the transmission line 2, the transmission quality can be fully satisfied and the output value can be suppressed as much as possible without installing an attenuator. This means that the energy saving control can be performed. In addition, the reception unit 401 of the transmission apparatus 1 on the reception side can be prevented from deterioration and failure, and the network reliability can be increased, because the output value is gradually increased from the minimum optical output value (602 in FIG. 7), even if the receivable reception value on the reception side is not known.

Figure 10:
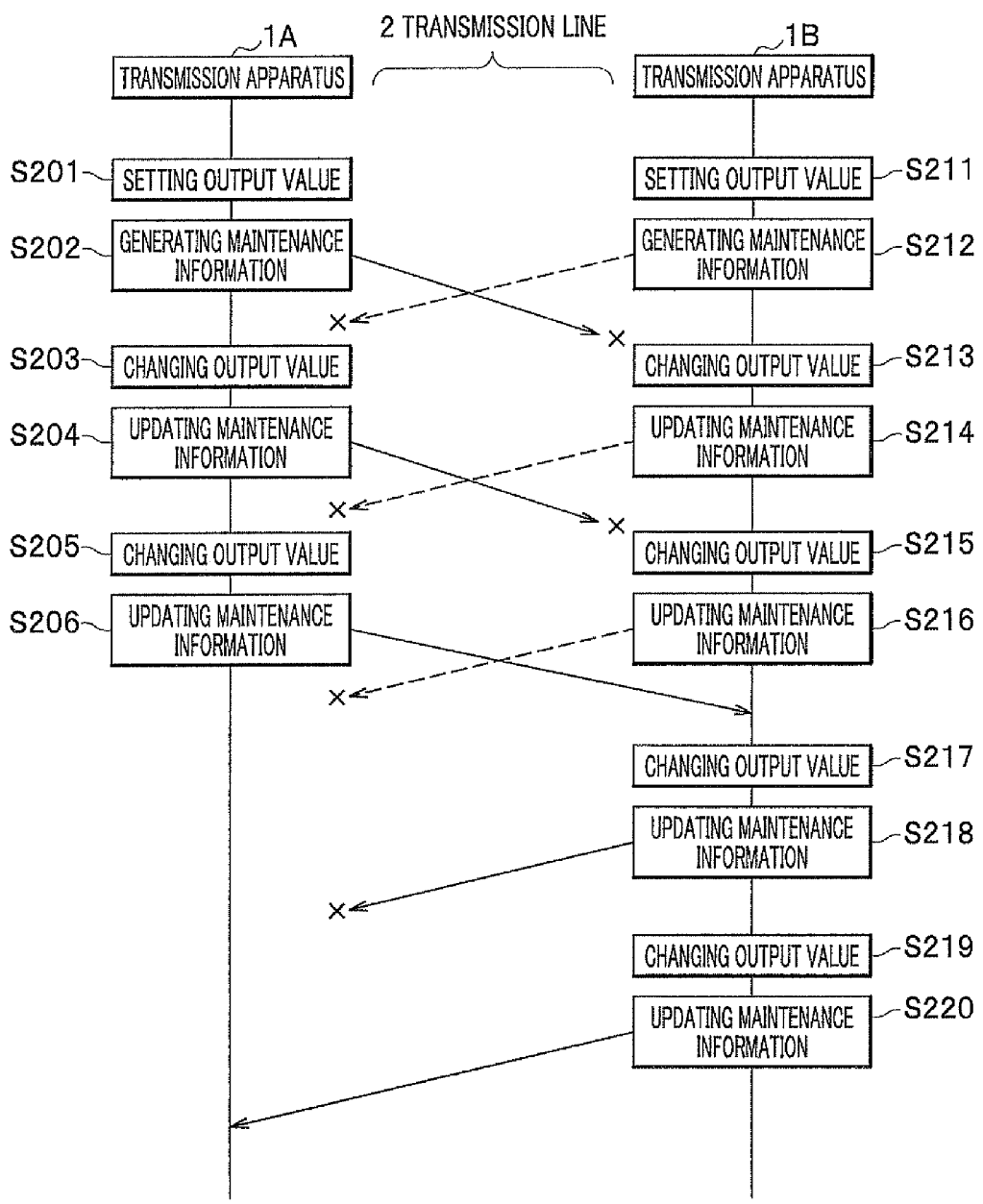
FIG. 10 is a diagram showing an overview of output value determination processes according to the first embodiment of the present invention.

FIG. 10 is a diagram showing an overview of output value determination processes according to the first embodiment of the present invention. In FIGS. 8 and 9, it is supposed as a general rule that after the maintenance information is sent from the station "A" side to the station "B" side and is received by the transmission apparatus 1B on the station "B" side, the maintenance information is sent from the station "B" side to the station "A" side. However, both of the station "A" side and the station "B" side actually transmit the maintenance information in parallel as shown in FIG. 10. Among arrows in FIG. 10, the solid line arrows are the parts described in FIGS. 8 and 9, and the dashed line arrows are the parts omitted in FIGS. 8 and 9 to avoid becoming complicated. Here, correspondences between the step numbers in FIG. 10 and the step numbers in FIGS. 8 and 9 are listed below, S201: S103, S202: S104, S203: S108, S204: S109, S205: S113, S206: S114, S217: S122, S218: S123, S219: S127, S220: S128. The processes of steps S211 to S216 in FIG. 10 are the processes omitted in FIGS. 8 and 9 to avoid becoming complicated, and the details of the processes are the same as steps S103 to S116 in FIG. 8.

Figure 11:
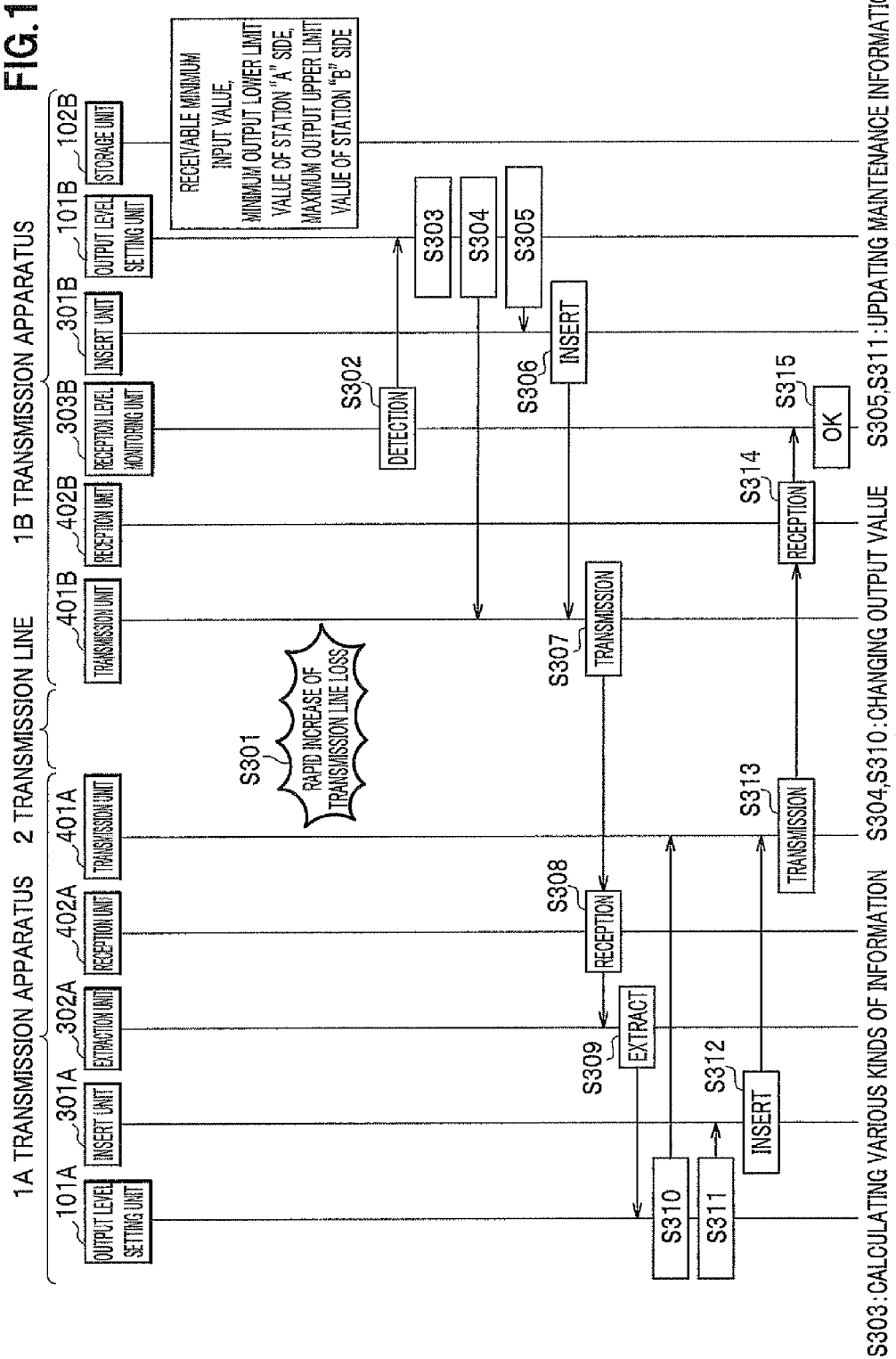
FIG. 11 is a sequence diagram showing a procedure of processes for the transmission line loss according to the first embodiment of the present invention.

FIG. 11 is a sequence diagram showing a procedure of processes for a transmission line loss according to the first embodiment of the present invention. The processes described in FIG. 11 show the sequence diagram related to the recovery processes of communication in a situation that the loss of the transmission line 2 is rapidly increased. When the loss of the transmission line 2 is rapidly increased, the maintenance information cannot be transmitted and received. As a consequence, there is a possibility that the output value is not realigned and the communication between the terminal on the own station side and the terminal on the opposite station side is not performed. Processes to solve such a problem will be explained with reference to FIG. 11.

The maintenance information is always imparted to the output information in the normal transmission and reception of information. The reception level monitoring unit 303 monitors if an error rate calculated from an error correction code which is imparted to the output information is lower than a specified value stored in the storage unit 102, and if a reception value of the received output information is larger than the monitoring threshold value (721 in FIG. 7).

In the storage unit 102B are stored in the step S119 of FIG. 8 the "receivable minimum input value (of station "B" side)" and the "minimum output lower limit value of station "A" side", and is stored the "maximum output upper limit value of station "B" side" which is calculated in the step S134 and notified to the transmission apparatus 1B by the maintenance information. In addition, the same information as the storage unit 102B is also stored in the storage unit 102A (not shown) of the transmission apparatus 1A.

When the loss of the transmission line 2 rapidly increases (S301), the reception level monitoring unit 303B detects that the loss of the transmission line 2 has been rapidly increased (S302) in such a way as to detect that the error rate has become higher than or equal to the specified value, or that the reception value of the reception information has become smaller than or equal to the monitoring threshold value 721. In other words, the reception level monitoring unit 303B detects that the loss of the transmission line 2 is larger than or equal to a predetermined degree.

Then, the output level setting unit 101B calculates the following various kinds of information (S303). The output level setting unit 101B calculates the "maximum output upper limit value of station "A" side" (701 in FIG. 7) by adding the level margin (712 in FIG. 7) and the receivable maximum input difference on the station "B" side (713 in FIG. 7) to the "minimum output lower limit value of station "A" side" (703 in FIG. 7) stored in the storage unit 102B. Then, the output level setting unit 101B of the transmission apparatus 1B changes the output value of the transmission unit 401B (S304). At this time, the output level setting unit 101B sets as the output value to the transmission unit 401B the value of "maximum output upper limit value of station "B" side" (701 in FIG. 7) which is stored in the storage unit 102B.

Then, the output level setting unit 101B updates the maintenance information (S305). The output level setting unit 101B writes the "maximum output upper limit value of station "B" side" into the field of "output value of station "B" side" of the maintenance information at this time. In addition, the output level setting unit 101B writes the "maximum output upper limit value of station "A" side" (701 in FIG. 7) calculated in the step S303 into the fields of "output request value for station "A" side" and "maximum output upper limit value for station "A" side" of the maintenance information. In other words, the output level setting unit 101B sets the own maximum output upper limit value to the output value of the transmission unit 401B as well as requests the transmission apparatus 1A on the station "A" side to set the output value to the "maximum output upper limit value of station "A" side".

Then, the insert unit 301B inserts the updated maintenance information into the output information (S306), and the output information is sent from the transmission unit 401B to the transmission line 2 (S307). The output information B having the intensity of the maximum output upper limit value on the station "B" side is sent at this time.

When the reception unit 402A of the transmission unit 1A receives the output information (S308), the extraction unit 302A extracts the maintenance information from the received output information (S309). Then, the output level setting unit 101A changes the output value of the transmission unit 401A to the "maximum output upper limit value of station "A" side" written in the field of "output request value for station "A" side" of the received maintenance information (S310).

Then, the output level setting unit 101A updates the maintenance information (S311). The "maximum output upper limit value of station "A" side" is written in the field of "output value of station "A" side" of the maintenance information, and the "maximum output upper limit value of station "B" side" is written in the fields of "output request value for station "B" side" and "maximum output upper limit value for station "B" side" of the maintenance information. It should be noted that the "maximum output upper limit value of station "B" side" (701 in FIG. 7) is stored in the storage unit 102A not shown in FIG. 11. Then, the insert unit 301A inserts the maintenance information to the output information (S312), and the transmission unit 401A transmits the output information to the transmission line 2 (S313).

When the reception unit 402B in the transmission unit 1B receives the transmitted output information (S314), the reception level monitoring unit 303B confirms that the error rate calculated from the error correction code which is imparted to the transmitted output information is lower than the specified value stored in the storage unit 102, and that the reception value of the received output information is larger than the monitoring threshold value (721 in FIG. 7) (OK: S315).

By the above processes, the output values of the transmission apparatus 1A and the transmission apparatus 1B respectively become the "maximum output upper limit value". In other words, the both output values of "station "A" side→station "B" side" and "station "B" side→station "A" side" become the maximum output upper limit values. Therefore, the transmission line 2 can be immediately recovered while the reception unit 402 of the transmission apparatus 1 is protected, even if the loss of the transmission line 2 is varied. Moreover, the transmission apparatuses 1 monitor the error rate and the reception value on the reception side, and perform the processes of FIG. 11 on the basis of the monitoring results. As a consequence, the transmission apparatuses 1 can immediately increase the output value and can recover the transmission line, thereby improving the reliability of the transmission line 2, even if the loss of the transmission line 2 rapidly increases and the output information (maintenance information) does not reach the opposite station.

However, the output value on the transmission side is so high in this state that unnecessary power consumption occurs during the transmission. Therefore, when a predetermined time elapses after the process of the step S315, the output value will be gradually decreased.

Figure 12:
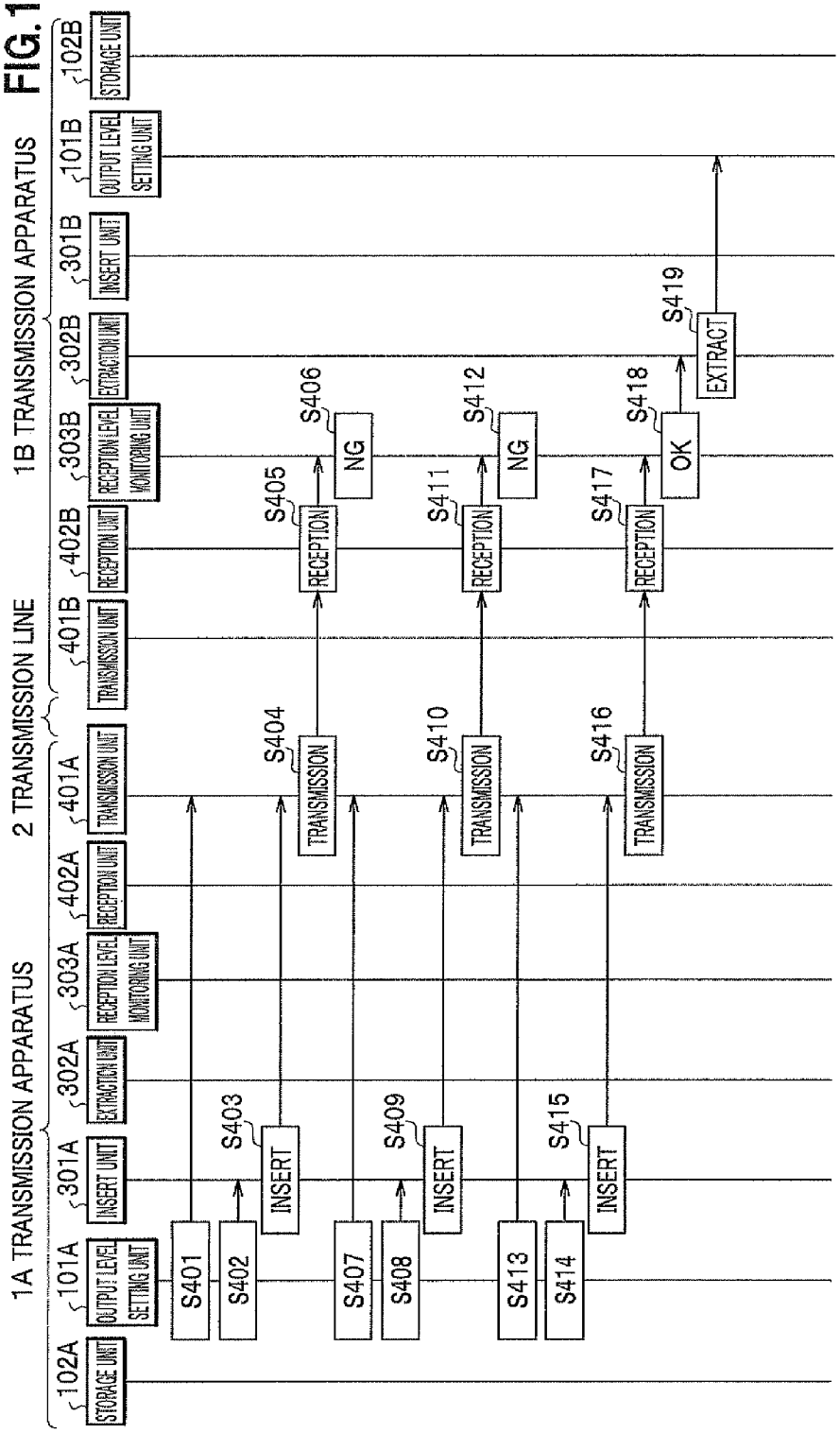
FIG. 12 is a sequence diagram showing a procedure of output value determination processes after the processes for the transmission line loss (Part 1).
Figure 13:
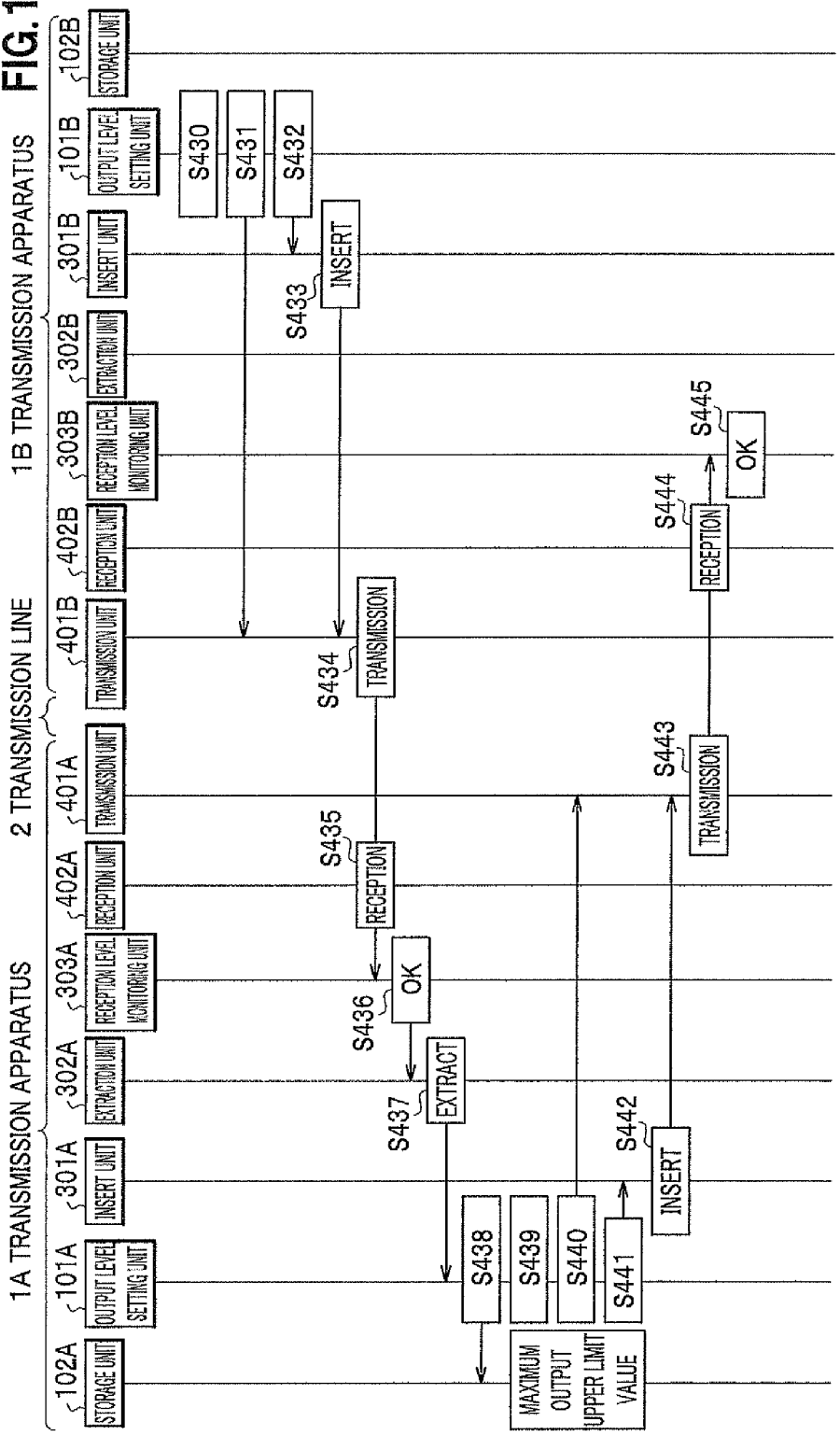
FIG. 13 is a sequence diagram showing a procedure of output value determination processes after the processes for the transmission line loss (Part 2).

FIGS. 12 and 13 are sequence diagrams showing a procedure of output value determination processes after the processes of FIG. 11. When a predetermined time elapses after finishing the processes of FIG. 11, the output level setting unit 101A changes the output value of the own transmission unit 401A to the value subtracted by a predetermined value from the set "maximum output upper limit value" (701 in FIG. 7: suppose Xmax) (S401), and updates the maintenance information to be written with the subtracted output value (S402). The value of "Xmax−x" is written in the maintenance information as the "output value of station "A" side" at this time. Here, "x" is a predetermined value. In addition, the other fields in the maintenance information remain vacant. Then, the generated maintenance information is inserted into the output information by the insert unit 301A (S403), and the output information is transmitted from the transmission unit 401A to the transmission line 2 (S404). At this time, the output information having the intensity of "Xmax−x" is transmitted.

When the reception unit 402B receives the output information (S405), the reception level monitoring unit 303B determines the reception value. In this case, since the reception value is large compared to the reception recommendation input value on the station "B" side (711 in FIG. 7), the reception level monitoring unit 303B determines the value is "NG" (S406). The reception recommendation input value is a value obtained by adding the level margin (712 in FIG. 7) to the receivable minimum input value (of station "B" side) (612 in FIG. 7) stored in the storage unit 102B shown in FIG. 11.

After confirming that a response has not come from the transmission apparatus 1B on the station "B" side for a predetermined time, the output level setting unit 101A changes the output value of the own transmission unit 401A to the value subtracted by the predetermined value (S407), and updates the maintenance information (S408). At this time, the output value of the transmission unit 401A is "Xmax−2x", and the value is written in the field of "output value of station "A" side" of the maintenance information. The other fields in the maintenance information remain vacant. Then, the generated maintenance information is inserted into the output information by the insert unit 301A (S409), and the output information is transmitted from the transmission unit 401A to the transmission line 2 (S410). At this time, the output information having the intensity of "Xmax−2x" is transmitted.

When the reception unit 402B receives the output information (S411), the reception level monitoring unit 303B determines the reception value. In this case, since the reception value is large compared to the reception recommendation input value on the station "B" side (711 in FIG. 7), the reception level monitoring unit 303B determines the value is "NG" (S412).

After confirming that a response has not come from the transmission apparatus 1B on the station "B" side for a predetermined time, the output level setting unit 101A changes the output value of the transmission unit 401A to the value subtracted by the predetermined value (S413), and updates the maintenance information (S414). At this time, the value of "Xmax−3x" is written as the output value of the transmission unit 401A in the maintenance information. The other fields in the maintenance information remain vacant. Then, the generated maintenance information is inserted into the output information by the insert unit 301A (S415), and the output information inserted with the maintenance information is outputted from the transmission unit 401A (S416). At this time, the output information having the intensity of "Xmax−3x" is transmitted.

When the reception unit 402B receives the output information (S417), the reception level monitoring unit 303B determines the reception value. In this case, since the reception value is the same as the reception recommendation input value (711 in FIG. 7) on the station "B" side or within a predetermined range from the reception recommendation input value, the reception level monitoring unit 303B determines the value is "OK" (S418).

Then, the extraction unit 302B on the station "B" side extracts the maintenance information from the received output information (S419).

Next, the output level setting unit 101B calculates the following various kinds of information (S430 in FIG. 13). First, the output level setting unit 101B calculates the "maximum output upper limit value of station "A" side" by adding the receivable maximum input difference (713 in FIG. 7) to the value (Xmax−3x) written in the field of "output value of station "A" side" of the received maintenance information.

During above processes, the transmission apparatus 1B has been performing the same processes as the steps S401 to S412 in parallel with the processes performed by the transmission apparatus 1A, although the processes in the transmission apparatus 1B are not shown in FIGS. 12 and 13. The output level setting unit 101B changes the output value of the transmission unit 401B from the previous output value (suppose "Y1") to the value ("Y1−y") subtracted by a predetermined value (S431). Subsequently, the output level setting unit 101B updates the maintenance information (S432). The output level setting unit 101B writes the current output value ("Y1−y") of the transmission unit 401B into the field of "output value of station "B" side" of the maintenance information at this time. Then, the output level setting unit 101B writes the "output value of station "A" side" of the received maintenance information into the field of "output request value for station "A" side" and writes the calculated "maximum output upper limit value for station "A" side" into the appropriate field of the maintenance information.

Then, the insert unit 301B inserts the updated maintenance information into the output information (S433), the output information is transmitted from the transmission unit 401B to the transmission line 2 (S434). At this time, the output information having the intensity of the output value "Y1−y" is transmitted.

When the reception unit 402A receives the output information (S435), the reception level monitoring unit 303A determines the reception value. In this case, since the reception value is the same as the reception recommendation input value (711 in FIG. 7) on the station "A" side or within a predetermined range from the reception recommendation input value, the reception level monitoring unit 303A determines the value is "OK" (S436). Here, if the reception level monitoring unit 303A determines that the value is "NG", the transmission apparatus 1B subtracts the predetermined value from the output value and transmits the output information to the transmission apparatus 1A after changing the maintenance information. Then, the extraction unit 302A extracts the maintenance information from the output information (S437), and the output level setting unit 101A stores the various kinds of information of the maintenance information in the storage unit 102A (S438). Here, the information stored in the storage unit 102A is the "maximum output upper limit value (of station "A" side)".

Next, the output level setting unit 101A calculates the various kinds of information (S439). Here, the output level setting unit 101A calculates the "maximum output upper limit value for station "B" side" by adding the receivable maximum input difference (713 in FIG. 7) to the value written in the field of "output value of station "B" side" of the received maintenance information.

Then, the output level setting unit 101A changes the output value of the transmission unit 401A to the value written in the field of "output request value for station "A" side" of the received maintenance information (S440), and updates the maintenance information (S441). At this time, the changed value becomes the intensity for the appropriate output value (702 in FIG. 7) on the station "A" side. In the maintenance information at this time, as the "output value of station "A" side" is written the value which is written in the field of "output request value for station "A" side" of the received maintenance information, as the "output request value for station "B" side" is written the value which is written in the field of "output value of station "B" side" of the received maintenance information, and as the "maximum output upper limit value for station "B" side" is stored the value calculated in the step S439. When the insert unit 301A inserts the updated maintenance information into the output information (S442), the transmission unit 401A transmits the output information to the transmission line 2 (S443), and the reception unit 402B receives the output information (S444). Since the reception value is the same as the reception recommendation input value (711 in FIG. 7) on the station "B" side or within a predetermined range from the reception recommendation input value, the reception level monitoring unit 303B determines that the value is "OK" (S445). Hereafter, the transmission apparatus 1A and the transmission apparatus 1B transmit and receive information with the appropriate output value.

By the above control, the transmission apparatus 1 can set the appropriate output value for the transmission line 2 again.

Second Embodiment

Next, a second embodiment according to the present invention will be explained with reference to FIG. 14. In the first embodiment, it is necessary to insert the maintenance information in the output information of the transmission line 2 for the energy saving control. However, there is a case that the maintenance information cannot be inserted into the output information because the output information is in the state of 100% for the transmission line bandwidth, and the control as in the first embodiment cannot be carried out. The method to solve such a problem will be explained in the second embodiment.

(System Configuration)

Figure 14:
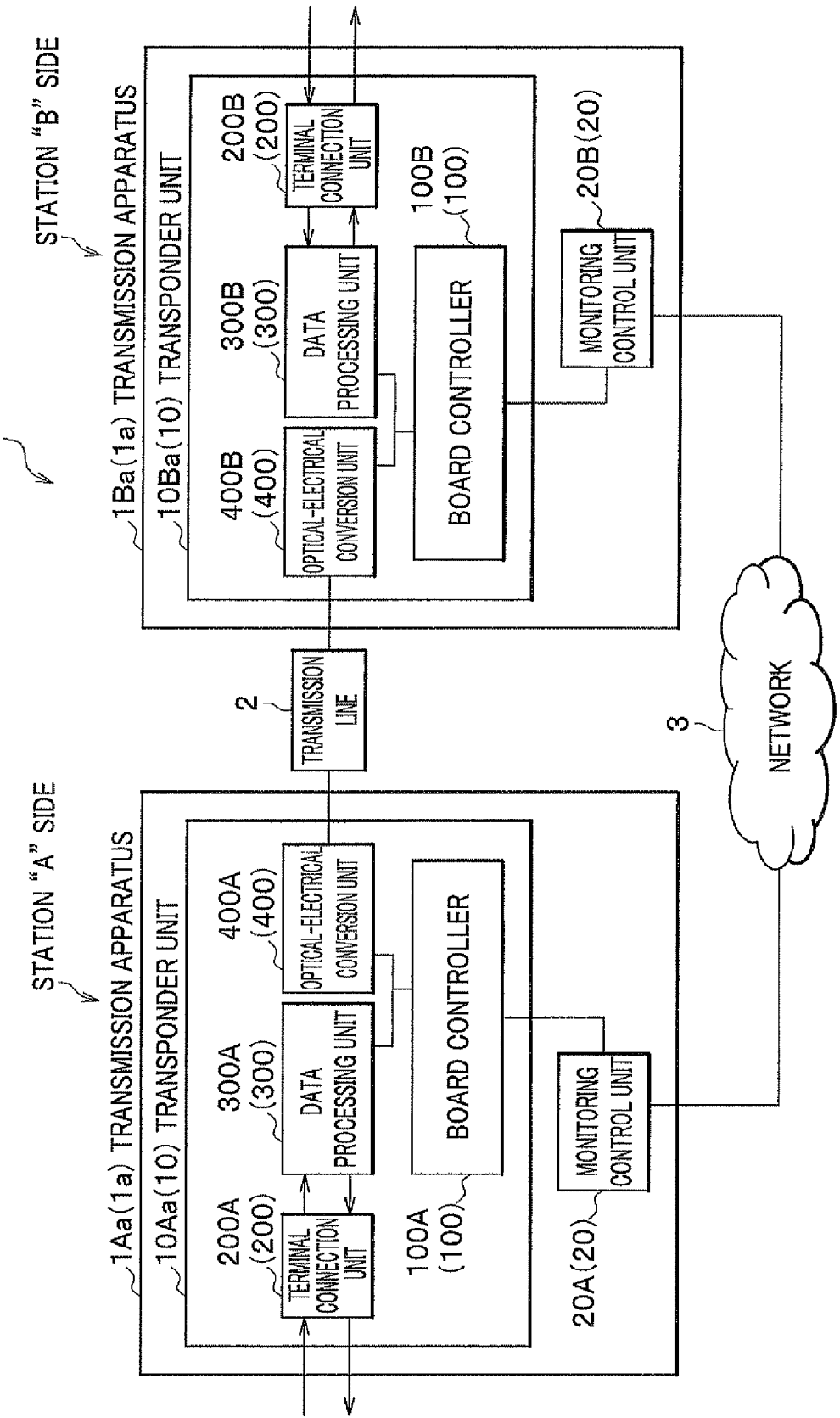
FIG. 14 is a block diagram showing a configuration example of an optical transmission system according to a second embodiment of the present invention.
Figure 15:
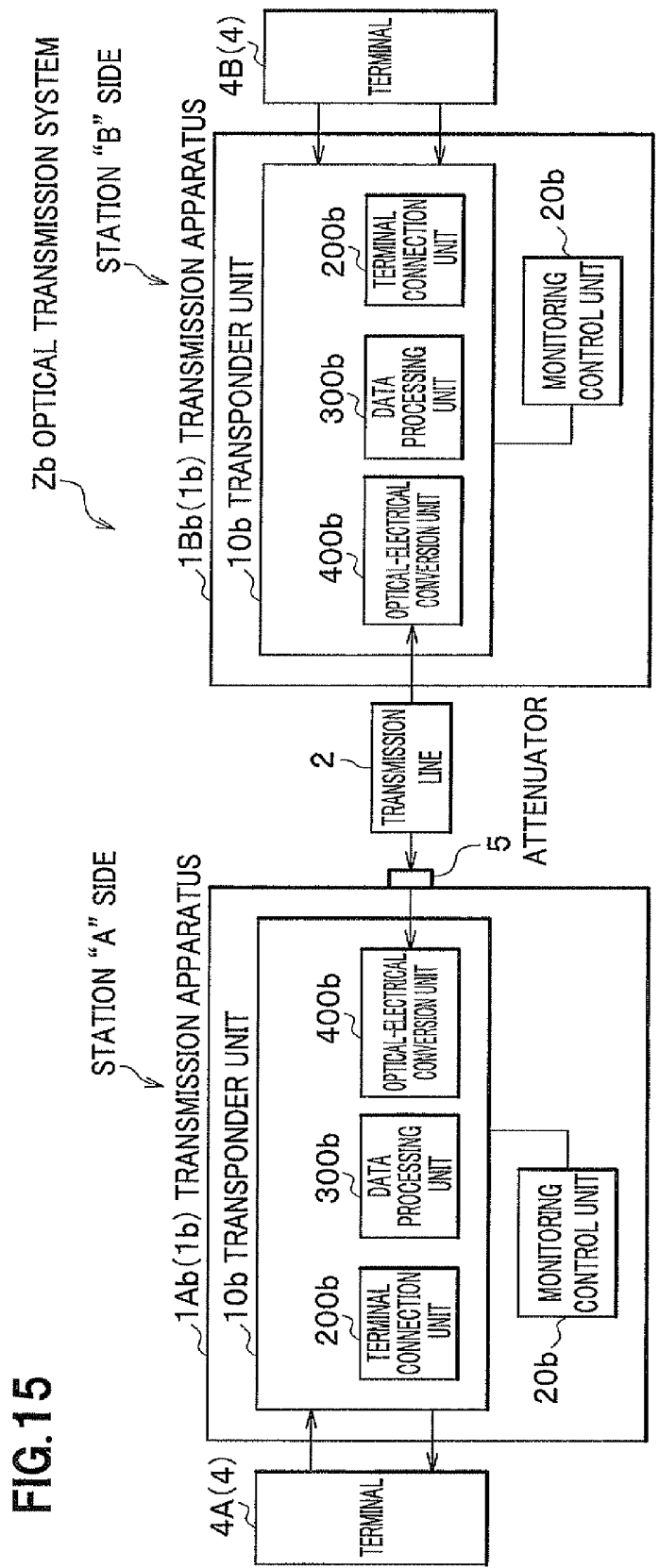
FIG. 15 is a diagram showing a typical configuration example of a conventional optical transmission system.

FIG. 14 is a block diagram showing a configuration example of an optical transmission system according to the second embodiment of the present invention. It should be noted that, in FIG. 14, the same constituent elements as those of FIG. 1 are denoted by the same reference signs and the explanations thereof will be omitted. The transmission apparatus 1*a* in FIG. 14 is different from that of FIG. 1 in that the transmission apparatuses 1*a* have monitoring control units 20 (20A, 20B) connected to the board controllers 100 (100A, 100B), and the monitoring control unit 20A of the transmission apparatus 1Aa and the monitoring control unit 20B of the transmission apparatus 1Ba are connected with each other through a network 3 which is different from the transmission line 2. In addition, in the data processing unit 300, the insert unit 301 and the extraction unit 302 in FIG. 1 can be omitted.

The output level setting unit 101, the data processing unit 300, the insert unit 301, the extraction unit 302, the reception level monitoring unit 303, and the monitoring control unit 20 are realized by the CPU executing programs stored in the ROM.

In the first embodiment, the maintenance information is inserted in the output information, and is transmitted and received between the transmission apparatuses 1 through the transmission line 2. However, in the second embodiment, the maintenance information is transmitted and received by the monitoring control units 20 through the network 3 which is different from the transmission line 2. The output information is transmitted and received through the transmission line 2 without the maintenance information being inserted. In addition, the reception level monitoring unit 303 measures the reception value of the output information received through the transmission line 2, and the output value setting unit 101 sets the output value and the like on the basis of the measured reception value. Since the processes in the second embodiment are almost the same as in FIGS. 8, 9, 11, 12, and 13 except that there is no process in which the maintenance information is inserted into the output information and extracted from the output information, and except that the maintenance information is transmitted and received through the network 3, the detailed explanations of the processes will be omitted. The network 3 may not be configured with an optical cable.

According to the second embodiment, since it is not necessary to insert the maintenance information into the output information, the maintenance information can be transmitted and received even if the output information is in the state of 100% for the transmission line bandwidth. In other words, it is possible to save the bandwidth of the transmission line 2. According to the second embodiment, the reliability of the optical transmission system can be improved since the maintenance information can be transmitted and received even in the state that the transmission line 2 is completely shut off.

In this embodiment, it is assumed that the transmission line 2 is an optical cable, but not to limited to this, it is also applicable to the cases in which the transmission line 2 is other media.

REFERENCE SIGNS LIST 1, 1A, 1B, 1a, 1Aa, 1Ba, 1b, 1Ab, 1Bb: transmission apparatus
2: transmission line
3: network
4, 4A, 4B: terminal
10, 10A, 10B, 10b: transponder unit
20, 20A, 20B, 20b: monitoring control unit
100, 100A, 100B: board controller
101, 101A, 101B: output level setting unit
102, 102A, 102B: storage unit
200, 200A, 200B, 200b: terminal connection unit
300, 300A, 300B, 300b: data processing unit
301, 301A, 301B: insert unit
302, 302A, 302B: extraction unit
303, 303A, 303B: reception level monitoring unit
400, 400A, 400B, 400b: optical-electrical conversion unit
401, 401A, 401B: transmission unit
402, 402A, 402B: reception unit
601: maximum output value
602: minimum output value
611: receivable maximum input value
612: receivable minimum input value
621: out of receivable range
701: maximum output upper limit value
702: appropriate output value
703: minimum output lower limit value
711: reception recommendation input value
712: level margin
713: receivable maximum input difference
Z, Za, Zb: optical transmission system

The invention claimed is:

1. An output value control method for controlling an output value of output information transmitted from each of transmission apparatuses including a first transmission apparatus and a second transmission apparatus between which the output information is transmitted and received by the transmission apparatuses, comprising the steps of;

the first transmission apparatus transmitting the output information having a minimum output value as the output value to the second transmission apparatus which is different from the first transmission apparatus as well as notifies the minimum output value as an own output value to the second transmission apparatus, the first transmission apparatus repeating a transmission of the output information and a notification of the own output value at the time of the transmission after increasing the own output value by adding a predetermined value to a previous output value when the output information does not reach the second transmission apparatus, the second transmission apparatus receiving the output information calculating the output value of the first transmission apparatus on the basis of the notified output value, and notifying the calculated output value of the first transmission apparatus as an appropriate output value to the first transmission apparatus, and the first transmission apparatus transmitting and receiving information to and from the second transmission apparatus with the notified appropriate output value.

2. The output value control method as set forth in claim 1, wherein the second transmission apparatus calculates a maximum output upper limit value which is a maximum output value allowed to be outputted by the first transmission apparatus on the basis of the calculated appropriate output value, the second transmission apparatus notifying the calculated maximum output upper limit value to the first transmission apparatus.

3. The output value control method as set forth in claim 2, wherein when the second transmission apparatus detects that a loss of a transmission line is larger than or equal to a predetermined degree, the second transmission apparatus sets the own output value to the maximum output upper limit value, and then instructs the first transmission apparatus to set the output value in the first transmission apparatus to the maximum output upper limit value in the first transmission apparatus.

4. The output value control method as set forth in claim 3, wherein after the first transmission apparatus sets the own output value to the maximum output upper limit value, the first transmission apparatus gradually decreases the output value until a reception value in the second transmission apparatus becomes a reception recommendation input value which is an appropriate reception value of the output information while the first transmission apparatus notifies the own output value to the second transmission apparatus, and when the reception value in the second transmission apparatus becomes the reception recommendation input value, the second transmission apparatus notifies the notified output value as the output value of the first transmission apparatus to the first transmission apparatus.

5. The output value control method as set forth in claim 1, wherein the output information and each of the notifications are transmitted and received through a transmission line.

6. The output value control method as set forth in claim 5, wherein the transmission line is constituted by an optical cable.

7. The output value control method as set forth in claim 5, wherein
the transmission line includes a first transmission line through which main signals are transmitted and received, and a second transmission line which is different from the first transmission line, and
the notifications being transmitted and received through the second transmission line.

8. The output value control method as set forth in claim 7, wherein the first transmission line is constituted by an optical cable.

9. A transmission apparatus that transmits and receives information, comprising: a transmission unit that transmits the information to an other transmission apparatus, a reception unit that receives the information from the other transmission apparatus, and
an output value setting unit that sets an output value in the transmission unit, and notifies the output value to the other transmission apparatus, and wherein the output value setting unit sets the output value in the transmission unit to a minimum output value, and notifies the minimum output value through the transmission unit to the other transmission apparatus which is a transmission destination of the output information, the output value setting unit increasing the output value of the transmission unit by adding a predetermined value to a previous output value, and repeating a transmission of the output information and a notification of an own output value at the time of the transmission, when the output information does not reach the other transmission apparatus, the output value setting unit calculating an output value of the transmission apparatus in an originating source of the output information on the basis of the notified output value, and notifying the calculated output value of the originating transmission apparatus as an appropriate output value to the transmission apparatus in the originating source of the output information, when the output information from the other transmission apparatus is received in the reception unit, and the output value setting unit setting the notified appropriate output value as the output value of the transmission unit, when the appropriate output value is notified to the originating transmission apparatus.

10. The transmission apparatus as set forth in claim 9, wherein
the output value setting unit calculates on the basis of the calculated appropriate output value a maximum output upper limit value which is a maximum output value allowed to be outputted by the transmission apparatus in the originating source of the output information,
the output value setting unit notifying the calculated maximum output upper limit value to the originating transmission apparatus.

11. The transmission apparatus as set forth in claim 10, further comprising a reception level monitoring unit that measures a reception value of the received information, wherein
the output value setting unit sets the output value of the transmission unit to the maximum output upper limit value, and then instructs the other transmission apparatus to set the output value in the other transmission apparatus to the maximum output upper limit value in the other transmission apparatus, when the reception level monitoring unit detects that a loss of the transmission line is larger than or equal to a predetermined degree.

12. The transmission apparatus as set forth in claim 11, wherein
the output value setting unit gradually decreases the output value of the transmission unit while notifying the output value of the transmission unit to the other transmission apparatus until the output value becomes a reception recommendation input value which is an appropriate reception value of the output information in the other transmission apparatus, after setting the output value of the transmission unit to the maximum output upper limit value,
the output value setting unit notifying the notified output value as the output value of the transmission apparatus in the originating source of the output information to the originating transmission apparatus, when the reception level monitoring unit detects that the reception value of the output information transmitted from the other transmission apparatus becomes the reception recommendation input value.

* * * * *